Sept. 24, 1963     P. J. POST ETAL     3,104,840
APPARATUS FOR WINDING TOROIDAL CORES
Filed Oct. 23, 1961     2 Sheets-Sheet 2
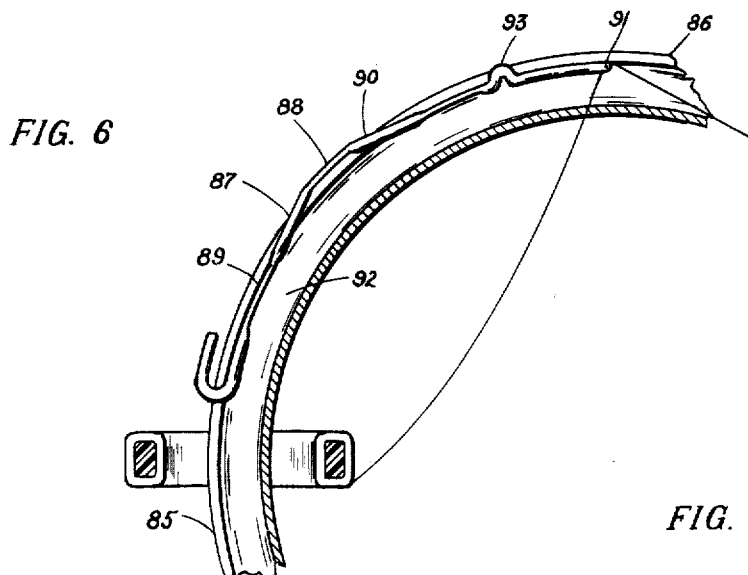
FIG. 6
FIG. 7
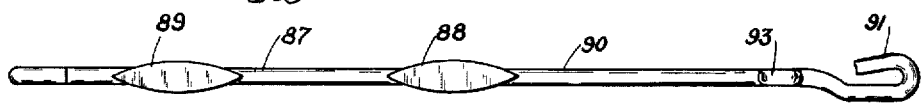
FIG. 8
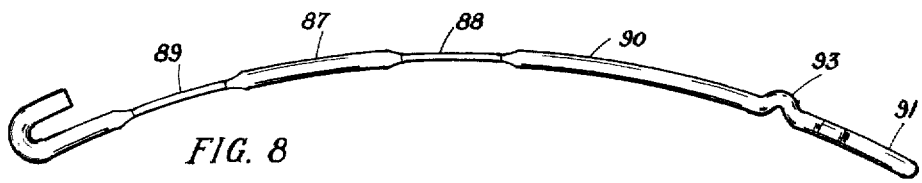
FIG. 9
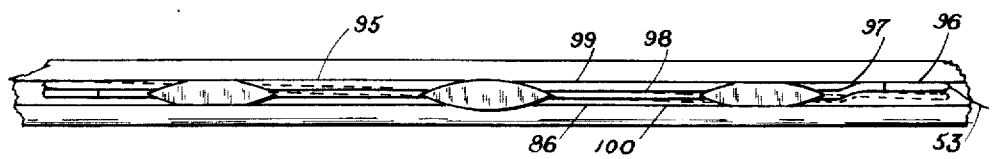
FIG. 10
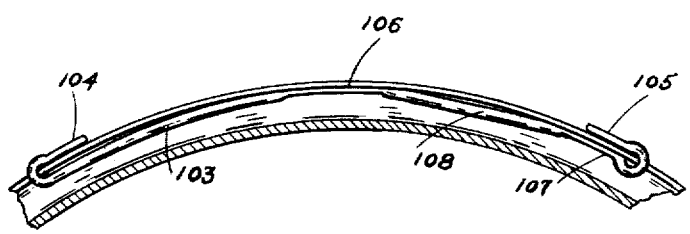
INVENTORS
PAUL J. POST
BY EDWARD F. MOYNIHAN
Pearson + Pearson
ATTORNEYS

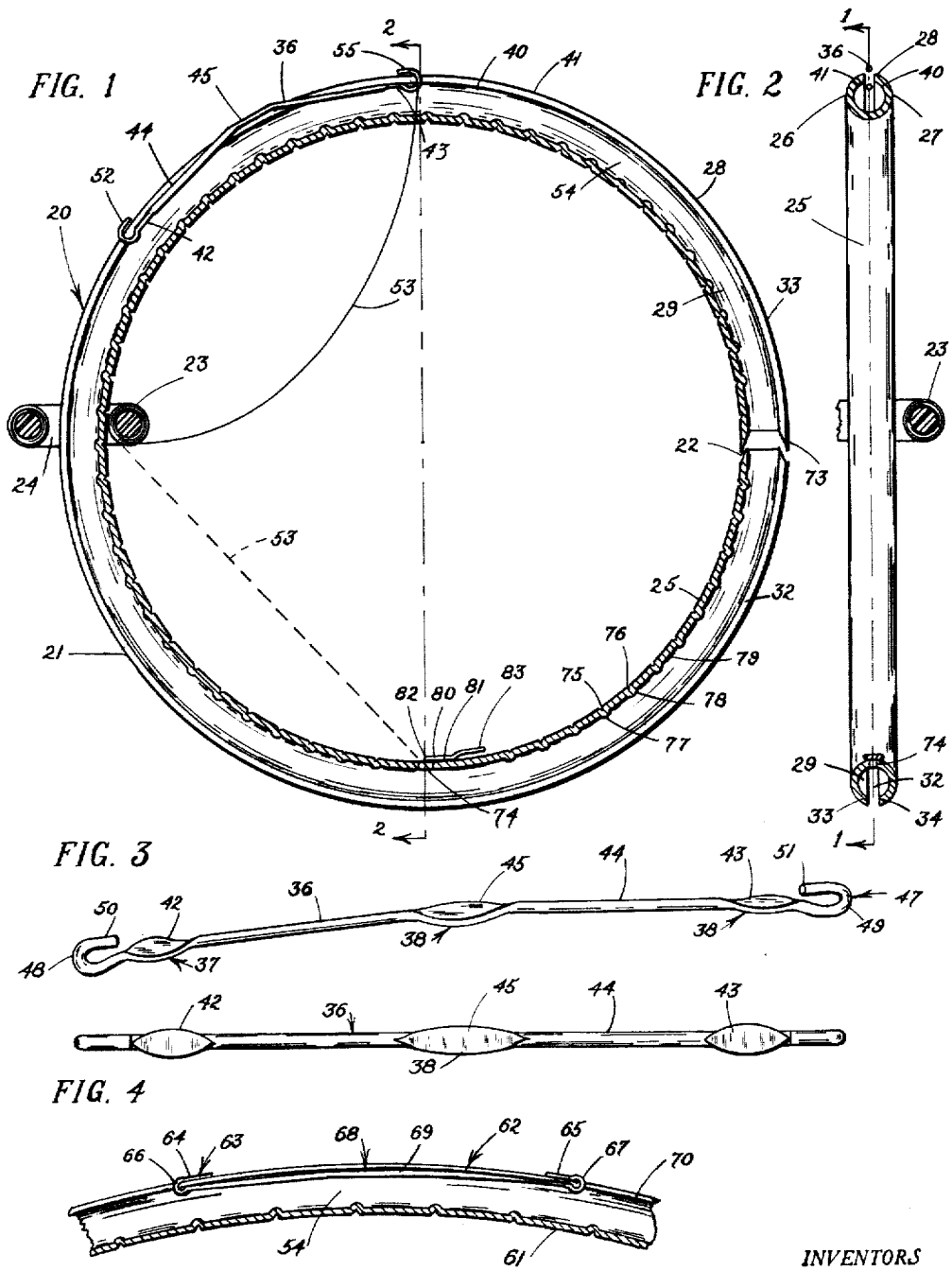

United States Patent Office 3,104,840
Patented Sept. 24, 1963

3,104,840
APPARATUS FOR WINDING TOROIDAL CORES
Paul J. Post, 25 Keefe Road, Acton, Mass., and Edward
F. Moynihan, 202 Old Sudbury Road, Sudbury, Mass.
Filed Oct. 23, 1961, Ser. No. 146,789
12 Claims. (Cl. 242—4)

This invention relates to improved apparatus for winding wire around toroidal cores.

Winding machines for the purpose are well known in the art and may include a split, annular shuttle, or bobbin, carrying a supply of wire in a peripheral channel or compartment therearound, the shuttle rotating through the centre of the core and wrapping a convolution of wire on the core with each revolution of the shuttle. Such a machine is described and illustrated in U.S. Patent 2,810,530 to Marsters of October 22, 1957, wherein the wire is fed from the inner periphery of the shuttle onto the core and the resiliency of the shuttle constitutes the tensioning means. Such a machine is also described and illustrated in U.S. Patent 2,850,247 to Frederick of September 2, 1958, wherein the wire is fed from the outer periphery of the shuttle onto the core and a resilient guide, slidable peripherally around the shuttle within the wire channel, constitutes the tensioning means. Since the shuttle mounting means, shuttle driving means and core mounting means are explained in detail in the above mentioned patents and in many other patents, such means are not described in detail herein.

The object of this invention is to provide winding apparatus in the form of a split, annular shuttle with a narrow, peripheral, wire-feed slot and a tensioning guide slidable in the feed slot whereby the wire carrying capability of the shuttle, and its ability to pass through an annular core, are affected to the minimum.

Another object of the invention is to provide a combined wire carrying, annular shuttle and slidable tensioning guide, the combination permitting the shuttle to be loaded with wire, a core to be wound, the core to be removed and a new core installed all without requiring the removal of the guide from the shuttle.

A further object of the invention is to provide a combined wire carrying, annular shuttle and slidable, tensioning guide in which the guide is spring loaded in a radial plane to ride in the shuttle feed slot, the guide thus being yieldable in a radial plane into the slot to reduce the outside dimensions of the shuttle for passing through the centre of a core.

Still another object of the invention is to provide a multi-purpose wire carrying shuttle capable of feeding from the inner periphery without a guide or capable of feeding from the outer periphery with a guide and, therefore, usable with many different types of existing winding machines.

A still further object of the invention is to provide a winding apparatus comprising a split, hollow, tubular, annular shuttle with a bowed, spring loaded, tensioning guide slidable in the shuttle feed slot, the guide being usable through a substantial range of wire sizes without requiring adjustment of its tension.

Other objects and advantages of the invention will be apparent from the claims, the description of the drawing and from the drawing in which FIG. 1 is a side elevation, in half section, of winding apparatus constructed in accordance with the invention;

FIG. 2 is an end elevation, in section on line 2—2, of FIG. 1;

FIG. 3 is an enlarged perspective view of the wire tensioning guide shown in FIGURES 1 and 2;

FIG. 4 is a plan view of the guide shown in FIG. 3;

FIG. 5 is a fragmentary, enlarged, side elevation similar to FIG. 1 showing a shuttle of especially small cross sectional area and the modified tensioning guide used therewith;

FIG. 6 is a fragmentary view similar to FIG. 1 showing the wire tensioning follower of the invention with the integral follower hook extending laterally within the compartment of a conventional shuttle;

FIG. 7 is an enlarged plan view of the follower shown in FIG. 6;

FIG. 8 is a side elevation of the follower shown in FIG. 7.

FIG. 9 is a fragmentary plan view of a modified form of follower in which the hook is laterally offset from the shank to normally bear against one wall of the shuttle slot, and FIG. 10 is a view similar to FIG. 5 showing a conventional slotted shuttle with a wire tensioning guide having flats on the hooks, a flat at the centre and a flat on the shank at the hooked wire follower end.

In the drawing the winding apparatus 20 of the invention is illustrated in a preferred embodiment, but enlarged in scale for clarity. Winding apparatus 20 includes the annular, hollow, tubular wire-carrying shuttle 21 and includes a split 22 to enable the shuttle to be passed through the centre of an annular toroidal core such as 23. It will be understood that the inside diameter of core 23 may be of relatively large size, in which case winding the same may not be especially difficult. The winding apparatus 20 of this invention has been found to increase efficiency and reduce time in winding such cores. However, the apparatus 20 is especially useful in winding unusually small sized cores which may have an inside diameter as small as one sixteenth inch in length or which may be in the range of three thirty seconds of an inch to one quarter of an inch in inside diameter. The wire wound on such cores is usually of small diameter and relatively fragile and breakage often occurs due to uneven tension during winding. The shuttle 21 may, therefore, have an outside diameter such as illustrated, but the outside diameter of the tube of the shuttle and the inside diameter of the core may be much smaller than illustrated such as one sixteenth of an inch, the tube being of slightly less cross sectional area than the area of the hole 24 in the core to pass therethrough.

The shuttle 21, while preferably formed of one piece of material such as metal, includes the inner peripheral wall 25, a pair of opposite side walls 26 and 27 and an outer peripheral wall 28, the walls defining a wire-carrying compartment 29 of annular configuration. The outer peripheral wall 28 includes a narrow, elongated, continuous, wire-feeding slot 32 extending peripherally entirely around the shuttle 21 and preferably formed by the inturning of the side walls 26 and 27 so that the opposed edges 33 and 34 of the side walls define the slot.

Winding appartus 20 also includes an elongated, resilient, arcuate, or bowed, wire tensioning guide 36 preferably formed of wire of circular cross section and about thirty or forty degrees in overall angular length relative to the shuttle 21. The guide 36 is of slightly less lateral width than the width of the slot 32 and is slidably mounted in the slot 32 for peripheral movement around the shuttle 21. The slot 32 is for loading a coil of wire into the compartment 29 and for feeding the wire out of the compartment during winding so that the space between the edges 33 and 34 occupied by the guide is freely available without diminishing the volume, or load carrying ability of the compartment 29.

The guide 36 includes first retarding means 37 and second retarding means 38 longitudinally spaced therealong and extending laterally in opposite directions therefrom to slidably engage the interior face 40 and the exterior face 41 of outer wall 28 adjacent the slot 32. As shown in FIGURES 1–4, for cores having an inside diameter of three thirty seconds of an inch and up, the means 37 comprises a flattened, widened section 42 and 43, each at an opposite end of the shank 44 of the guide 36 and the means 38 comprises a similar flattened widened section 45 at the centre of the shank 44. The guide 36 is flexible and resilient with a predetermined inherent bow. When inserted in shuttle 21, the flats 42 and 43 slidably engage the interior face of the outer wall 28 and the flat 45 slidably engages the exterior face of outer wall 28, the predetermined bow of the guide being slightly flattened to spring load the guide into frictional engagement with the shuttle but with a predetermined degree of slippage. To vary the tension exerted on a wire by the guide 36, its predetermined inherent bow can be varied by manual bending and the guide reinserted in the shuttle to provide a greater or lesser tension as desired. Wire follower means 47 is provided on guide 36 at least at one end thereof and preferably at each opposite end thereof. Follower means 47 is formed by turning the opposite ends of the shank 44 outwardly as at 48 and 49 and then rearwardly as at 50 and 51 toward each other and substantially parallel to shank 44. A hook 52 is thus formed at one end of the guide 36 which projects outwardly beyond the slot for receiving and following a wire 53 being uncoiled from the coil 54 in compartment 29 through slot 32 for wrapping around core 23. The guide thus slips around the slot 32 with the uncoiled wire exerting a retardation force and a predetermined tension thereon, the guide halting when tension is released during each turn of the shuttle. A hook 55 is thus formed at the other end of the guide which is used for restraining the guide while the shuttle is being turned for loading a supply of wire therein through feed slot 32, thereby permitting the guide to remain continually in the shuttle during loading and unwinding.

As shown in FIG. 5 a shuttle 61 corresponding to shuttle 21, and of very small cross sectional area such as one sixteenth inch, is preferably provided with a guide 62 corresponding to guide 36 but of modified form. The first retarding means 63 of guide 62 comprises the flats 64 and 65 formed in the backturned portion of the hooks 66 and 67 while the second retarding means 68 comprises the central flat 69. The pre-bowed, flexible, resilient guide 62, differs from guide 36, in that the central flat 69 rides inside the slot 70, within the wire chamber, while the end flats 64 and 65, on the hooks 66 and 67, ride outside the slot 70. Thus minimum space is occupied by the guide 62 with practically all of the guide in the feed slot 70 and only the flat portions 64, 65 and 69 extending inside or outside the slot. The hooks 66 and 67 are relatively flat but capable of guiding and feeding a wire, because the wire used in such a winding apparatus will be of small diameter.

The shuttle 21, as described above, is suitable for outside feeding of wire in winding machines of many different types. Preferably, however, the shuttle 21 is also designed to serve as an inside feed shuttle of the type of the Marsters patent above mentioned, but with increased efficiency. Shuttle 21, is therefore, flexible, resilient with a telescopable joint 73 at split 22 and a feed aperture 74 in the inner wall 25. Tension is controlled by the expansion and contraction of the shuttle, the tension of the wire being fed, contracting the diameter of the shuttle to permit the coiled supply to slip around the wire carrying compartment 29.

Uneven tension sometimes occurs in inside feed shuttles, especially toward the end of the unwinding therefrom, perhaps for the reason that the last few convolutions of the coiled supply 54 in the compartment 29 tend to frictionally grip the shuttle unduly and then may release their grip quickly to overrun and pay off too much wire through the inside aperture. The shuttle 21, therefore, includes a plurality of spaced recesses such as 75 and 76, entirely around the inner peripheral wall 25, which form corresponding spaced protuberances, or bearings such as 77 and 78 in the interior face 79 of the inner wall 25. The coil supply 54 is thus supported only at spaced zones thereabout by the protuberances 77 and 78 with friction considerably reduced. To prevent overrunning, a leaf spring 80 is fixed to the wall 25 by welding at 81, or by other suitable means with a free terminal end 82 overlying the aperture 74 to resiliently snub the wire 53 when fed out through aperture 74. The other end 83 of the spring 80 is relatively rigid and spaced from the inner wall 25 to serve as a catch upon which the end of the wire 53 may be fixed during loading of the shuttle 21.

The wire 53 is shown in full lines as being outside fed from slot 32, the outside feeding operation being well known in the art and clearly disclosed in the above mentioned Frederick patent. The wire 53 is shown in dotted lines as being inside fed from aperture 74, such feeding also being well known and clearly disclosed in the above mentioned Marsters patent.

In FIG. 6 a conventional, annular, split shuttle 85, having a peripheral feed slot 86 carries an elongated, resilient, arcuate, or bowed, wire tensioning guide 87 similar to guide 36. The second retarding means constitutes the central flat 88 and the first retarding means constitutes a flat 89 at one end of shank 90 and the turned back, integral, wire follower hook 91 at the other end of the shank, the hook 91 being within the wire compartment 92. An integral portion 93 of shank 90 extends radially outwardly into slot 86 for guiding the wire follower end of the guide.

In FIG. 9 an elongated, resilient, arcuate or bowed wire tensioning guide 95 is shown, similar to guide 36 but having the wire follower hook 96 axially offset at 97, in an amount about equal to the width of the shank 98, into parallelism with the remainder of shank 98. The feed tension of wire 53 on the hook 96 pulls the hook away from the wall 99 of the slot 86 in the shuttle 85, toward the opposite wall 100 of the slot as shown in dotted lines. Upon cessation of feed tension the hook 96 is released to slidably engage wall 99 and prevent discharge of the next succeeding loop of wire 53 through the slot 86.

In FIG. 10 a wire tensioning guide 103 similar to guide 68 is shown, having flats at 104, 105 and 106 corresponding to flats 64, 65 and 69. An additional flat is provided at 107 on the portion of the shank 108 beneath the flat 105 for slidably and frictionally engaging the exterior and interior faces of the shuttle 109. It is necessary to open the shuttle 109, at its split, to thread the flats 105 and 107 thereon, but the opposed flats tend to reduce breakage of the wire 53 during the feeding cycles of the shuttle.

With unusually heavy wire it has been found desirable to not only offset the wire follower hook of the guide as shown in FIG. 9, but to also offset the hook 110 at the opposite end of the guide in a lateral direction opposite to the lateral offset 97.

We claim:

1. Apparatus for winding toroidal cores, said apparatus comprising in combination a split, annular, hollow, substantially tubular, wire-carrying shuttle having a narrow, wire-feeding slot extending continuously around the outer peripheral wall thereof; an elongated, resilient, arcuate, wire-tensioning guide, of slightly less width than the width of said slot, slidably mounted in said slot for peripheral movement around said shuttle, first retarding means at each opposite end of said guide and second retarding means in the centre of said guide, one said means slidably engaging the interior face of said outer wall on each opposite side of said slot and the other said means engaging the exterior face of said outer wall on each opposite side of said slot and wire follower means on at least one end of said guide extending outwardly beyond said slot for receiving and guiding a wire to be wound, the inherent resiliency of said guide spring loading said first and second retarding means into frictional engagement with the interior and exterior faces of said outer wall but intermittently releasing said guide to peripheral movement around said shuttle under tension from said wire.

2. Apparatus as specified in claim 1 wherein said first and second retarding means are each integral with said guide and each comprises an enlarged section of said guide of greater width than the width of said narrow slot.

3. Apparatus as specified in claim 1 wherein said guide is formed of resilient material of circular cross section and said retarding means, each comprise a portion of said material flattened to greater width than the width of said slot.

4. Apparatus for winding toroidal cores, said apparatus comprising in combination a split, hollow, annular, tubular shuttle having an outer, peripheral wall with a narrow, continuous slot therearound; an arcuate, resilient guide slidably received in said slot for peripheral movement around said shuttle and tensioning means on said guide extending laterally therefrom in opposite lateral directions and including portions extending inside, and portions extending outside, said wall for controlling the rate of peripheral movement of said guide around said shuttle.

5. Apparatus as specified in claim 4 wherein said guide includes an integral hook at each opposite end thereof, each said hook projecting radially outside said slot for receiving and following a wire to be wound.

6. A split, annular, hollow, tubular wire carrying shuttle having an outer peripheral wall with a narrow, continuous wire feeding slot therearound; a bowed, resilient, wire-tensioning guide slidably mounted in said slot for peripheral movement around said shuttle and tensioning means, spaced along said guide and projecting laterally in each opposite direction therefrom, said means slidably engaging the inside and outside of said outer wall proximate said slot for retarding the peripheral movement of said guide but permitting such movement under predetermined tension exerted by a wire on said guide.

7. A combination as specified in claim 6 wherein said guide is bent outwardly and then back upon itself at each opposite end to form hooks which project radially outside said slot and said tensioning means comprises a section of said guide, proximate each opposite end and at the centre thereof, enlarged to greater width than the width of said slot.

8. In combination, a split, annular, hollow tubular wire-carrying shuttle having a pair of opposed side walls turned inwardly toward each other to form an outer peripheral wall, the opposed edges of said side walls defining a narrow, continuous slot extending peripherally around the outside of said shuttle and a bowed, resilient, elongated guide of circular cross section mounted in said slot for peripheral movement around said shuttle, said guide having a flattened, enlarged section at each opposite end slidably engaging the interior faces of said side walls adjacent said slot and a flattened, enlarged section, at the centre thereof, slidably engaging the exterior faces of said side walls adjacent said slot for frictionally and resiliently retarding said guide with predetermined slippage.

9. A wire tensioning guide for split annular shuttles having a continuous peripheral slot in, and an interior and exterior face on the outer peripheral wall thereof, said guide comprising a bowed, elongated, resilient shank of less width than the width of said slot, said shank having at least three longitudinally spaced, laterally extending retarding flats therealong, each of greater width than the width of said slot, at least one said flat slidably engaging one said face and the remaining flats slidably engaging the other said face of said outer peripheral wall and an integral wire follower forming one end of said shank, said follower including a portion normal to said flats for extending radially outwardly into said slot for guiding by the walls of said slot.

10. A wire tensioning guide as specified in claim 9 wherein the width of said shank is substantially less than the width of said slot and said integral follower is laterally offset into parallelism with the remainder of said shank whereby tension of feeding pulls said follower portion toward one wall of said slot and cessation of feed tension releases said integral follower into engagement with the opposite wall of said slot.

11. A wire tensioning guide as specified in claim 9 wherein said integral follower is a back turned portion of said shank forming a hook for projecting outwardly through said slot.

12. A wire tensioning guide as specified in claim 9 wherein said integral follower is a back turned portion of said shank forming a laterally extending hook, the base of said hook including said portion normal to said flats for extending radially outwardly into said slot.

References Cited in the file of this patent
UNITED STATES PATENTS

| | | |
|---|---|---|
| 2,726,817 | Barrows | Dec. 13, 1955 |
| 2,793,818 | Clarke et al. | May 28, 1957 |

UNITED STATES PATENT OFFICE
Certificate

Patent No. 3,104,840

Patented September 24, 1963

Paul J. Post and Edward F. Moynihan

Application having been made jointly by Paul J. Post and Edward F. Moynihan, the inventors named in the patent above identified, for the issuance of a certificate under the provisions of Title 35, Section 256 of the United States Code, deleting the name of the said Edward F. Moynihan from the patent as a joint inventor, and a showing and proof of facts satisfying the requirements of the said section having been submitted, it is this 8th day of September 1964, certified that the name of the said Edward F. Moynihan is hereby deleted from the said patent as a joint inventor with the said Paul J. Post.

[SEAL]

EDWIN L. REYNOLDS,
*First Assistant Commissioner of Patents.*